Aug. 16, 1949.  J. C. McALVAY  2,479,077
BALANCED HYDRAULIC PUMP OR MOTOR
Filed July 23, 1945
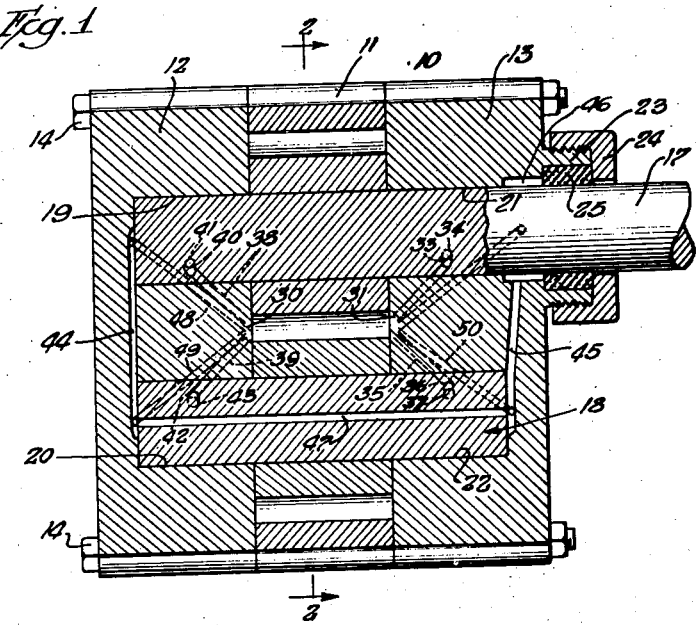
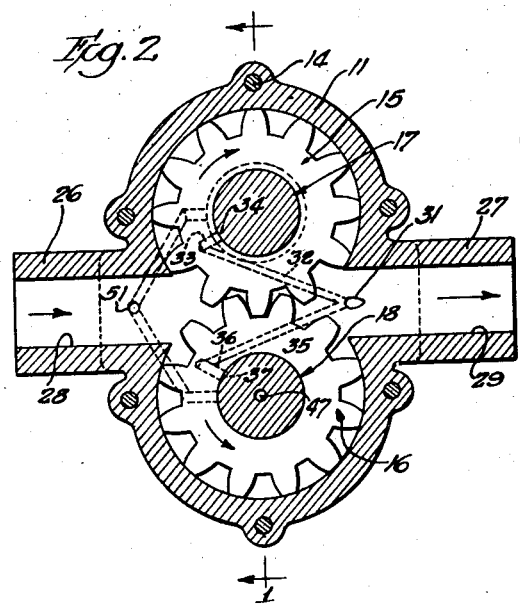
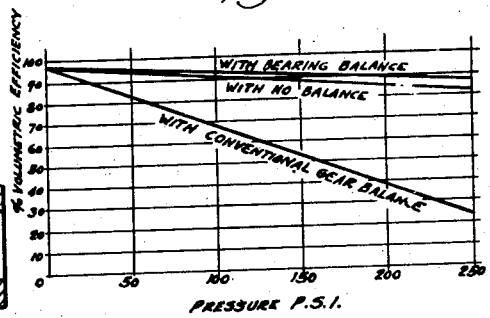
Inventor:
John C. McAlvay
By: McCaleb, Wendt + Dickinson
Attys.

Patented Aug. 16, 1949

2,479,077

UNITED STATES PATENT OFFICE 2,479,077

BALANCED HYDRAULIC PUMP OR MOTOR

John C. McAlvay, Racine, Wis., assignor to Webster Electric Company, Racine, Wis., a corporation of Delaware Application July 23, 1945, Serial No. 606,620

3 Claims. (Cl. 103—126)

The present invention relates to balanced hydraulic pumps or motors and is particularly concerned with hydraulic pumps or motors of the gear type.

One of the objects of the invention is the provision of an improved method of balancing such hydraulic motors or pumps by means of which a substantially exact and complete balance may be obtained.

Another object of the invention is the provision of an improved mode of balance of pumps or motors of the class described which results in the automatic centralization of the shafts radially in the bearing so that the slippage along the bearings is reduced in such manner as to eliminate the very considerable loss of delivery which takes place with the common methods of balancing in the gear itself according to the prior art.

Another object of the invention is the provision of an improved mode of balance of pumps or motors of the class described by means of which the bearings are continuously and effectively lubricated by the pumpage and by reason of the wedging of the film of hydraulic fluid between the shaft and the bearing, the shaft is actually prevented from coming in contact with the bearing surface, and the wear between these parts is greatly diminished.

Another object of the invention is the provision of an improved mode of balancing which is simple and which can in most cases be applied directly to pumps that were originally designed without provision for balancing and which results in a greatly reduced slippage and a considerably increased volumetric delivery over conventional gear balance methods of the prior art and which practically eliminates the possibilities of bearing seizure or bearing break-down and at the same time results in a great saving in power in the driving of a pump of this character.

Other objects and advantages of the invention will be apparent from the following description and the accompanying drawings, in which similar characters of reference indicate similar parts throughout the several views.

Referring to the single sheet of drawings accompanying this specification,

Fig. 1 is a transverse sectional view taken on the plane of the line 1—1 of Fig. 2 looking in the direction of the arrows;

Fig. 2 is a sectional view taken on the plane of the line 2—2 of Fig. 1 looking in the direction of the arrows, and Fig. 3 is a view showing curves of volumetric efficiency plotted against pressure in pounds per square inch on a gear pump with the present bearing balance, with no balance, and with the conventional gear balance of the prior art.

Referring to Fig. 1, 10 indicates in its entirety a gear pump which has been selected to illustrate the invention. This gear pump includes a housing plate 11, a cover plate 12 which also serves as a bearing plate, and a bearing plate 13.

These plates are suitably aligned by means of suitable dowels and sockets (not shown) and are secured together by a plurality of through screw bolts 14 which pass through all three plates and clamp them together. The thickness of the gear housing plate 11 is of course slightly greater than the axial thickness of the gears 15 and 16 so that the gears will have a sliding fit or clearance which permits them to rotate freely while slidably engaging the plane surfaces on the bearing plates 12 and 13.

While the mode of balance is illustrated in connection with a hydraulic gear pump, I desire it to be understood that it may also be employed in connection with motors of the hydraulic type.

The gears 15 and 16 are preferably keyed by means of suitable key and keyway (not shown) to their shafts, the shafts being indicated at 17 and 18, and the shafts 17 and 18 project axially beyond each end of the gears. Thus, the cover plate 12 is provided with suitable cylindrical bores 19 and 20 serving as bearings for the ends of the shafts 17 and 18 which project from that side of the gears.

The bearing plate 13 is provided with a through bore 21 for the drive shaft 17 so that the drive shaft may project outwardly from the pump to be provided with a suitable source of motive power. The bearing plate 13 is also provided with a bore 22 which is closed at one end and open inwardly to receive the end of the shaft 18 which projects from that side of the gear 16.

Any suitable type of packing may surround the protruding shaft end 17 such as, for example, the threaded hub 23 and gland 24 engaging packing 25.

The bearing portions of the shaft 17 and 18, that is, those portions which project into the bores 19, 20, 21 and 22, are so proportioned that the sum of the projected areas of the two bearing portions of each shaft is approximately equal to the projected area of the gear carried by the shaft. The two bearing portions are also, preferably made substantially equal on each of the two shafts. This involves making the bearing portion 19 as long as the bearing portion 21 and the bearing portion 20 as long as the bearing portion 22, assuming they are of the same diameter.

The housing plate is provided with a pair of outwardly projecting lugs 26 and 27 extending from its opposite sides, the former being provided with an inlet conduit 28 and the latter with an outlet conduit 29. The inlet conduit of course communicates with that portion of the gears which is becoming unmeshed while the outlet conduit communicates with that side of the gears where the gears are meshing and driving the fluid to be pumped out of the spaces between the teeth.

In order to effect a substantially exact and complete balance, the housing of the pump including the three members 11—13, is provided with suitable conduits which extend from a pair of ports 30 and 31 located in the outlet 29 of the pump so that a portion of the fluid under pressure may be applied to a predetermined area of the pump trunnions.

Referring to Fig. 2, the conduit 32 extends from the port 31 through the housing of the pump and communicates with a conduit 33 which has an outlet port 34 in the bearing 21 for shaft 17. In the same way, another conduit 35 from port 31 extends through the body of the housing over to conduit 36 which terminates in port 37 in the bearing 22 for shaft 18.

The port 30 likewise communicates with two conduits 38 and 39 one of which extends diagonally upward toward bearing 19 and the other toward bearing 20. Conduit 38 communicates with conduit 40 which terminates in port 41 in the wall of bearing 19 for shaft 17. Conduit 39 communicates with conduit 42 which terminates in port 43 in bearing 20 for shaft 18.

The ports 34, 37, 43 and 41 are preferably located midway between the ends of the bearing portions 19—22 respectively so that the fluid under pressure which is conducted to those bearings acts on a projected area at substantially the center of the projected area of those portions of the shafts in the respective bearings. The location of the ports 34, 37, 41 and 43 peripherally of the bearings is a matter which may be determined by trial and error exactly for any particular pump.

When the pump is operating, pumpage is admitted at inlet 28 and is carried around by the gears 17 and 18 in the tooth spaces and delivered from the outlet 29. Due to slippage past the teeth of the gears, a pressure gradient is established over the encased portion of the gear periphery, ranging from full delivery pressure at and near the discharge port, to the inlet pressure at and near the inlet port. It is the differential between these two pressures on the gears which is to be balanced. It has been determined experimentally that the discharge pressure may be assumed to exist over roughly one half of the gear periphery, and the inlet pressure over the other half. Thus, the thrust on the gear due to hydraulic loads may be assumed to be equal to the product of the projected area of the gear by the difference between the inlet and discharge pressures.

The location of the ports 34, 36, 41 and 43 is opposite to the discharge side of the gears so that the fluid under pressure coming from said ports acts upon the trunnions or shafts to produce a thrust which is equal and opposite to the thrust that is produced upon the gears. For this purpose the location shown in Figs 1 and 2 is substantially correct but this location varies slightly, depending upon the characteristics of the pump.

Thus, a portion of the pump discharge is admitted to the thrust side of each of the four bearings by means of the ports and conduits described and it passes along the bearings to regions connected to the inlet port. Thus, the same differential of pressure which exists across the gears also exists across the bearings.

As the sum of the projected areas of the bearings on each shaft equals the projected area of the gear carried by the shaft, the radial force produced hydraulically on the bearings is equal to that produced on the gear. By the proper placement of the ports radially and peripherally in the bearings, this force is caused to oppose the gear force, balancing it and effecting an exact and complete balance of the pump.

In order to provide communication between the bearings and the inlet port of the pump, the cover plate 12 may be provided with a conduit 44 and the opposite ends of the shafts may be connected by means of a conduit 45 which communicates with an annular space 46 surrounding shaft 17 inside the packing 25.

The passages 44 and 45 may be interconnected by a passage 47 drilled through the length of the driven shaft 18 and all of these conduits may be connected by one or more drilled passages in the body indicated at 48, 49, 50, leading to the inlet 28 by means of a port 51. Thus, the end regions of the shafts are connected to the inlet and tend to be maintained at inlet pressure and any leakage along the shaft is removed from the shaft 17 in advance of the packing 25. Furthermore, these conduits prevent pressure from building up at the end regions of the shaft which might otherwise disturb the balance attained by the present invention.

It will thus be noted that by altering the area of the bearings and by altering the position of the pressure port to the bearings, it is possible to provide adjustments in the amount and direction of the balancing forces to take care of the mechanical thrusts on the gears, thus completing the radial balance of the pump.

The operation of a device constructed according to the present invention should be carefully distinguished from the arrangements of the prior art which do not effect a complete balance. In the prior art devices the gears and shafts are forced toward one side of their respective housings and bearings, leaving on the other side a crescent-shaped opening through which a very large slippage occurs. At the same time the film of oil is broken down on the side towards which the gears and bearings are forced and there is a great deal of friction which results in undue wear and which necessitates the use of a considerable amount of power to drive the pump and eventually at predetermined high pressures bearing seizure results in such devices of the prior art.

With the present invention the shafts and gears are actually located concentrically with their respective bearings and housings and there is no crescent-shaped opening for slippage on any side, but the clearances may be made smaller and a film of oil exists between the gears and their housings and the shafts and their bearings, which maintains proper lubrication by pumpage at all times. The slippage is greatly reduced and the volumetric efficiency greatly increased and the pump may be used for a long period of time without likelihood of bearing seizure or excessive wear. At the same time, a pump so balanced requires much less power because of the reduction of friction and of course the amount of power required for a certain volume of delivery is reduced over the devices of the prior art.

Referring now to Fig. 3, in this figure three curves are shown in which volumetric efficiency is plotted against pressure in pounds per square inch. The middle curve shows the curve of volumetric efficiency at various pounds per square inch, the efficiency being plotted as a percentage of the theoretical delivery of such a pump. It will be noted that with no balance, the middle curve decreases in volumetric efficiency from 96% at zero output pressure to about 82%.

With the conventional gear balance of the prior art, the volumetric efficiency of the same pump decreases from 96% at zero output pressure to 23% at 250 lbs. per square inch, showing the marked decrease in efficiency of a pump provided with the so-called gear balance of the prior art.

When the same pump is provided with the exact and complete bearing balance according to the present invention, its volumetric efficiency at various pressures output is shown by the uppermost curve. It will be noted that the volumetric efficiency drops only from 96% to about 87% at 250 lbs. per square inch.

It is true that the curves of volumetric efficiency between no balance and with the present bearing balance do not show a great difference, but with no balance the operation of the pump is characterized by high wear, excessive use of power and possibility of bearing seizure. At higher pressures, such as 300 lbs. per square inch, with no balance, the lubricating films break down, but with the present bearing balance there is no bearing seizure even at 350 lbs. per square inch. Due to proper lubrication by the pumpage according to the present invention, a gear pump provided with the present bearing balance consumes much less power than the pumps with no balance or with the conventional gear balance of the prior art.

The great decrease in slippage or increase in volumetric efficiency of pumps according to the present invention over the gear balanced devices of the prior art, is explained by the fact that in the present pump the shafts and gears are substantially centralized in their bores. The clearances which act as leak passages in the devices of the prior art are halved in the present device and the leakage which would normally exist in a pump with no balance is decreased, resulting in the improvement in both delivery and efficiency of the pump of the present invention.

It will thus be observed that I have invented an improved balanced gear pump or motor or an improved method of balancing gear pumps by means of which the thrust exerted on the gears by the pressure of the hydraulic fluid that is being delivered, is quite exactly and completely counterbalanced so that the shafts and gears are automatically centralized and located concentrically in their bearings and housings. Thus the slippage along the bearings is reduced over that of a plain pump with no balancing, the bearings of the pump are continuously and effectively lubricated by the pumpage, and the shaft is prevented from coming in contact with the bearing surface by the wedging of a film of pumpage between the shaft and its bearing so that wear is minimized and greatly decreased over the devices of the prior art. The porting necessary to accomplish balance by this method is relatively simple and in most cases can be applied directly to pumps which were originally designed without provision for balancing and an exact and complete balance may be obtained.

Where it seems desirable to limit the size of bearings due to space limitations, this may be done either by changing the proportions of diameter to length or assuming that the pressures are not excessive, the areas of the bearings may be reduced to produce only a partial balance.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A hydraulic pump of the gear type provided with bearing balance, as distinguished from gear balance, comprising a housing formed of a housing plate, a cover plate, and a bearing plate, said housing plate being formed with two adjoining and communicating partially cylindrical chambers for slidably engaging the edges of a pair of gears, a pair of pumping gears meshing with each other and located in said chambers, in said housing, said pumping gears each being mounted upon a shaft, and each shaft projecting axially from each end of the pumping gears, said cover plate being provided with a pair of cylindrical bores forming bearings for the projecting ends of the shaft on that side of the gears, and said bearing plate being formed with a cylindrical bore forming a bearing for the other end of the shaft of the driven gear, all of said bores being closed at their outer ends, said bearing plate also having a through bore forming a bearing for the drive shaft and for passing the end of the drive shaft which projects therefrom, a packing surrounding said drive shaft at the outer end of said through bore, said housing plate being formed with an inlet leading to the space where the gears unmesh and an outlet leading to the space where the gears mesh with each other, said housing also having a pair of ports communicating with the said outlet and located one in the cover plate and one in the bearing plate, and each of said ports communicating with a pair of conduits extending through the cover plate and bearing plate, respectively, and terminating at the bearing surface of said bores substantially midway between the ends of said bores, the said points of termination being located peripherally with respect to said bores at a point at which the thrust that is placed on the gears by the outlet pressure is counterbalanced by the thrust which is placed on the bearings by the liquid which is pumped from the outlet to the bearings at said points of termination, the size and length of the projecting portions of said shafts in said bearings being proportioned to be substantially equal to the projected area of the gears so that the thrust on the gears is counterbalanced by the thrust on the shafts in their bearings and the shafts are floated in the liquid being pumped, to operate with a minimum amount of friction.

2. A hydraulic pump of the gear type provided with bearing balance, as distinguished from gear balance, comprising a housing formed of a housing plate, a cover plate, and a bearing plate, said housing plate being formed with two adjoining and communicating partially cylindrical chambers for slidably engaging the edges of a pair of gears, a pair of pumping gears meshing with each other and located in said chambers, in said housing, said pumping gears each being mounted upon a shaft, and each shaft projecting axially from each end of the pumping gears, said cover plate being provided with a pair of cylindrical bores forming bearings for the projecting ends of the shaft on that side of the gears, and said bearing plate being formed with a cylindrical bore forming a bearing for the other end of the shaft of the driven gear, all of said bores being closed at their outer ends, said bearing plate also having a through bore forming a bearing for the drive shaft in said plate and for passing the end of the drive shaft which projects therefrom, a packing surrounding said drive shaft at the outer end of said through bore, said housing plate being formed with an inlet leading to the space where the gears unmesh and an outlet leading to the space where the gears mesh with each other, said housing also having a pair of ports communicating with the said outlet and located one in the cover plate and one in the bearing plate, and each of said ports communicating with a pair of conduits extending through the cover plate and bearing plate, respectively, and terminating at the bearing surface of said bores substantially midway between the ends of said bores, the said points of termination being located peripherally with respect to said bores at a point at which the thrust that is placed on the gears by the outlet pressure is counterbalanced by the thrust which is placed on the bearings by the liquid which is pumped from the outlet to the bearings at said points of termination, the size and length of the projecting portions of said shafts in said bearings being proportioned to be substantially equal to the projected area of the gears so that the thrust on the gears is counterbalanced by the thrust on the shafts in their bearings and the shafts are floated in the liquid being pumped, to operate with a minimum amount of friction, the said cover plate and bearing plate also being provided with conduits leading from a pair of ports disposed in the inlet of the pump and extending to the closed ends of the bearings and to an annular space surrounding the drive shaft adjacent said packing, the closed ends of the two bearing bores in the cover plate being joined by a transverse conduit which communicates with an axial conduit extending through the driven shaft which communicates with the conduit extending to said annular space so that the leakage to the ends of the shafts is conducted to the inlet of the pump to prevent pressure from being built up at the ends of the shafts and at points adjacent said packing.

3. A hydraulic pump of the gear type provided with bearing balance, as distinguished from gear balance, comprising a housing formed of a housing plate, cover plate and a bearing plate, said housing plate comprising a metal member provided with opposite plane sides and having a pair of communicating parallel partially cylindrical through bores, for slidably engaging the edges of a pair of meshing gears, said housing plate also being provided with a laterally extending inlet conduit and a laterally extending outlet conduit, the inlet conduit communicating with the said bores at the side of the gears where the gears unmesh, and the outlet conduit communicating with said bores at the side of the gears where the gears mesh, a pair of meshing gears of the spur type located in said housing and slidably engaging the walls of said bores, and a shaft for supporting each of said gears, the said shafts comprising a drive shaft and an idler shaft, said cover plate comprising a metal member having a plane side for engaging the housing plate, and having a pair of cylindrical bores extending into said plane side for receiving the ends of said drive shaft and said idler shaft and forming bearings for the shafts, the said latter bores being closed at the outer ends and the thickness of said bearing and cover plates being sufficient to provide elongated bearings, the projected area of which is substantially equal to half the projected area of the gear supported by each shaft, the said bearing plate comprising a metal member having a plane surface for engaging the other side of the housing plate and having a through bore forming a bearing for said drive shaft in said bearing plate and provided with an annular packing recess surrounding the drive shaft, the said bearing plate also having a bore on its inner side for providing a bearing for the adjacent end of the idler shaft, a pair of conduits located in said cover plate, and a pair of conduits located in said bearing plate, one end of each of said conduits communicating with the pressure outlet of the pump and the other end of said conduits leading to an outlet conduit extending substantially normal to the axis of each shaft and located midway between the ends of the bearing bores in the cover and bearing plates, said latter outlet conduits being located peripherally of the said bearing bores at a point at which the pressure supplied to said latter outlet conduit counterbalances the thrust exerted on the two shafts by the gears, a conduit connecting the ends of the bearing bores in the cover plate, a conduit leading from the annular packing space surrounding the drive shaft to the end of the idler shaft bearing bore, said idler shaft having a conduit extending through it and communicating with said connecting conduit and said cover plate having a conduit from said connecting conduit to the inlet conduit of the pump, the latter conduits connected to the inlet serving to prevent the building up of pressure adjacent the ends of the bearing bores.

JOHN C. McALVAY.

REFERENCES CITED

The following references are of record in the file of this patent:

UNITED STATES PATENTS

| Number | Name | Date |
|---|---|---|
| 1,372,576 | Tullmann | Mar. 22, 1921 |
| 1,379,587 | Fisher | May 24, 1921 |
| 1,937,367 | Vickers | Nov. 28, 1933 |
| 2,111,883 | Burghauser | Mar. 22, 1938 |
| 2,176,787 | Burghauser | Oct. 17, 1939 |
| 2,212,994 | Vrolix | Aug. 27, 1940 |
| 2,319,374 | Ungar | May 18, 1943 |